(12) United States Patent
Claßen et al.

(10) Patent No.: US 11,464,603 B2
(45) Date of Patent: Oct. 11, 2022

(54) DENTAL TOOL AND DENTAL SYSTEM

(71) Applicant: KAVO DENTAL GMBH, Biberach (DE)

(72) Inventors: Thomas Claßen, Herbertingen (DE); Markus Haarmann, Biberach (DE); Bernhard Kuhn, Biberach (DE)

(73) Assignee: KAVO DENTAL GMBH, Biberach (DE)

( * ) Notice: Subject to any disclaimer, the term of this patent is extended or adjusted under 35 U.S.C. 154(b) by 128 days.

(21) Appl. No.: 15/424,368

(22) Filed: Feb. 3, 2017

(65) Prior Publication Data
US 2017/0224439 A1    Aug. 10, 2017

(30) Foreign Application Priority Data
Feb. 4, 2016    (EP) .......................... EP16 154 292.3

(51) Int. Cl.
*A61C 1/14*    (2006.01)
*A61C 3/06*    (2006.01)
(Continued)

(52) U.S. Cl.
CPC ............... *A61C 1/142* (2013.01); *A61C 1/05* (2013.01); *A61C 1/07* (2013.01); *A61C 1/148* (2013.01); *A61C 3/005* (2013.01); *A61C 3/02* (2013.01); *A61C 3/06* (2013.01); *A61C 17/005* (2013.01); *A61C 17/16* (2013.01); *A61C 17/22* (2013.01);
(Continued)

(58) Field of Classification Search
CPC .. A61C 1/142; A61C 1/14; A61C 1/05; A61C 1/07; A61C 1/148; A61C 3/06; A61C 17/005; A61C 17/22

USPC ....... 433/127, 128, 165, 114, 116, 125, 126, 433/112, 130, 124; 279/76; 285/126, 285/127, 129, 130; 403/136, 146
See application file for complete search history.

(56) References Cited

U.S. PATENT DOCUMENTS 1,443,079 A * 1/1923 Lefebvre ................. A61C 3/06
                                                                      279/158
2,135,933 A * 11/1938 Blair ....................... A61C 1/07
                                                                      433/122

(Continued)

FOREIGN PATENT DOCUMENTS

| EP | 0031409 A2 * | 7/1981 | ............ F16L 37/008 |
| WO | 2014/053218 | 4/2014 | |
| WO | 2014/111227 | 7/2014 | |

OTHER PUBLICATIONS

Becker, EP 0031409, machine translation (Year: 1981).*
EP16154292.3 Extended European Search Report dated Jul. 22, 2016 (9 pages).

*Primary Examiner* — Nicholas D Lucchesi
*Assistant Examiner* — Mirayda A Aponte
(74) *Attorney, Agent, or Firm* — Michael Best & Friedrich LLP

(57) ABSTRACT

The invention relates to a dental tool having a shank region, which is formed for coupling to a dental handpiece, and also having a work region, which is connected to the shank region. In this case, the shank region of the dental tool is formed so that there is the possibility of latchable insertion and removal without actuation. In particular, at least the shank region can consist of plastics material. As a result, facilitated handling of the tool and inexpensive production of the tool are rendered possible.

20 Claims, 7 Drawing Sheets

(51) Int. Cl.
*A61C 17/22* (2006.01)
*A61C 3/00* (2006.01)
*A61C 17/24* (2006.01)
*A61C 3/02* (2006.01)
*A61C 17/16* (2006.01)
*A61C 17/00* (2006.01)
*A61C 17/32* (2006.01)
*A61C 1/05* (2006.01)
*A61C 1/07* (2006.01)

(52) U.S. Cl.
CPC ............ *A61C 17/222* (2013.01); *A61C 17/24* (2013.01); *A61C 17/32* (2013.01)

(56) References Cited

U.S. PATENT DOCUMENTS

| | | | |
|---|---|---|---|
| 3,082,530 A * | 3/1963 | Hopf | A61C 3/02 279/23.1 |
| 3,578,745 A * | 5/1971 | Garnier | A61C 1/07 433/102 |
| 3,740,853 A | 6/1973 | Prahler | |
| 3,945,653 A * | 3/1976 | Falchle | B23B 31/005 279/97 |
| 4,954,082 A * | 9/1990 | Weissman | A61C 3/03 433/118 |
| 4,963,095 A * | 10/1990 | Weissman | A61C 1/07 433/114 |
| 5,040,978 A * | 8/1991 | Falcon | A61C 17/005 433/114 |
| 5,336,089 A | 8/1994 | Sakurai | |
| 5,369,916 A | 12/1994 | Jefferies et al. | |
| 5,762,498 A * | 6/1998 | Gonzalez | A61C 8/0089 433/165 |
| 5,911,577 A * | 6/1999 | Henrikson | A61C 17/005 433/125 |
| 6,193,242 B1 * | 2/2001 | Robison | B23B 31/1071 279/137 |
| 7,270,129 B1 * | 9/2007 | Rehkemper | A61C 17/225 132/322 |
| 8,118,594 B2 * | 2/2012 | Pernot | A61C 1/08 433/114 |
| 2009/0142730 A1 | 6/2009 | Pernot | |
| 2009/0170054 A1 | 7/2009 | Spahn | |
| 2010/0040995 A1 | 2/2010 | Müller | |
| 2015/0079540 A1 * | 3/2015 | Rek | A61C 1/148 433/122 |

* cited by examiner

DENTAL TOOL AND DENTAL SYSTEM

The invention relates to a dental tool having a shank region for coupling to a dental handpiece and having a work region. Moreover, the invention relates to a dental system having a handpiece and a corresponding tool.

As shown, by way of example, in FIG. 18, different dental tools are known from the prior art. The tools have a shank region, which is formed for coupling to a dental handpiece, and also a work region, here in the form of a brush or a polishing cup, connected to the shank region. The corresponding handpiece in this case has an elongate grip sleeve with a head region which has a receiving opening to receive a corresponding tool.

The shank region of such a tool is formed in accordance with the DIN EN 1797-1 or 1797-2 standard so that at its end lying opposite the work region it has an annular groove which is used for axial securement when the tool is inserted, as intended, into the head region.

The known tools are comparatively large and are connected to the head region with noticeable play. In the case of an oscillating movement of the tool this results in significant limitation of the effectiveness during use. Moreover, the known tools have disadvantages with respect to the outlay on production and the handling. Thus, for example, in order to remove a corresponding tool from the head region a pressure element formed at the head region has to be actuated.

The underlying object of the invention is to specify a corresponding improved tool. In particular, the tool, with ease of producibility, is to render possible facilitated operation as well as a high level of effectiveness. Moreover, a corresponding improved dental system having a handpiece and a corresponding tool is to be specified.

This object is achieved in accordance with the invention with the subject matter stated in the independent claims. Particular embodiments of the invention are specified in the dependent claims.

In accordance with the invention a dental tool is provided that has a shank region, which is formed for coupling to a dental handpiece, and also has a work region, which is connected to the shank region. In this case, the shank region of the dental tool is formed so that there is the possibility of latchable insertion and removal without actuation.

As a result, in particular facilitated handling of the tool is rendered possible.

At least the shank region of the tool in this case preferably consists of plastics material, silicone or rubber. As a result, given suitable mechanical properties for the attainment of the latching connection between the shank region and the handpiece, in particular particularly inexpensive production of the tool is rendered possible.

The work region in this case preferably also consists of plastics material, silicone or rubber. Particularly preferably, the shank region and the work region in this case consist of plastics materials, silicones or rubbers of differing hardness. Thus in a particularly suitable manner good force-transmitting properties of the shank region and in this case suitable mechanical properties of the work region can be attained.

Particularly simple production is rendered possible when the shank region and the work region are connected together in one piece.

The shank region is preferably formed in a substantially cylindrical manner and—with regard to a longitudinal axis of the shank region—is formed for axial or radial latching with a drive component of the dental handpiece. As a result, the tool can be connected to the handpiece in a particularly simple manner, that is, can be inserted into the head region and also removed again from the head region.

One or more spring arms are preferably arranged at the shank region. As a result, a particularly suitable latch or latching connection between the tool and the handpiece that is simple to produce, secure and yet, in a suitable manner, releasable again is rendered possible.

In this case, the shank region preferably has at least one slot through which spring arms running parallel to the longitudinal axis are formed. The spring arms can thus be formed in a particularly suitable manner. The slot can in this case, for example, be formed at the end of the shank region lying opposite the work region.

The spring arm or arms preferably have outwardly protruding latching projections or latching thickened portions, in particular at their end lying opposite the work region. As a result, particularly suitable axial securement of the tool in the head region of the handpiece is rendered possible.

The shank region preferably has an annular latching recess that preferably extends over the entire periphery. As a result, particularly suitable axial securement of the tool in the head region of the handpiece is also rendered possible.

The shank region preferably has a carrier region that is preferably located in the vicinity of the work region and is formed for form-locking coupling to a drive component of the dental handpiece. As a result, particularly suitable transmission of force from the drive component of the handpiece to the tool is rendered possible.

The carrier region preferably has an angular, for example a polygonal, outer periphery. A coupling with a low level of play can thus be attained in a particularly suitable manner.

The work region is preferably formed as a polisher, brush, grinder or file. In this case, the work region can, for example, advantageously be formed in a cup-like, conical or cylindrical manner.

In accordance with a further aspect of the invention, a dental system is provided having a dental handpiece, which has an elongate grip sleeve with a drive arranged therein and also a head region arranged at the front end of the grip sleeve for releasably receiving a dental tool, and also having a dental tool in accordance with the invention.

The drive is in this case preferably formed to transmit a rotational movement and/or vibration and/or axial lifting movement to the tool. This is particularly advantageous, for example, if the handpiece is a so-called prophylactic handpiece, in particular a so-called single prophylactic angle piece.

Preferably the grip sleeve and preferably also the head region have a plastics casing. As a result, a particularly pleasant grip feel is rendered possible when working with the handpiece. Such a plastics casing is also especially suitable for weight and cost reasons.

The grip sleeve with the head region preferably consists of plastics material. Thus in particular it is possible to obtain a configuration without a separating line. The plastics material is preferably polyetheretherketone (PEEK), polyphenylsulphone (PPSU) or polyetherimide (PEI).

The invention is explained in greater detail in the following with the aid of an exemplary embodiment and with reference to the drawings, in which.

Figure 1:
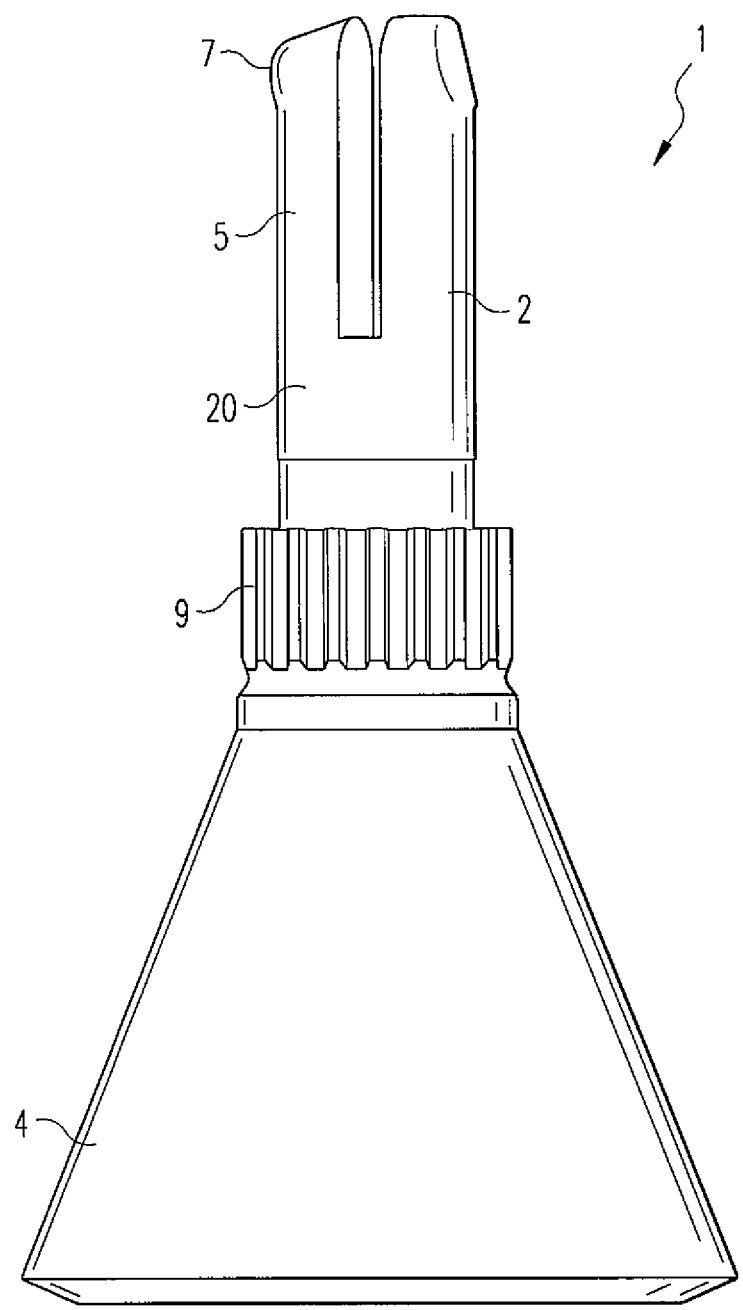
FIG. 1 shows a sketch of an exemplary embodiment of a tool in accordance with the invention.
Figure 2:
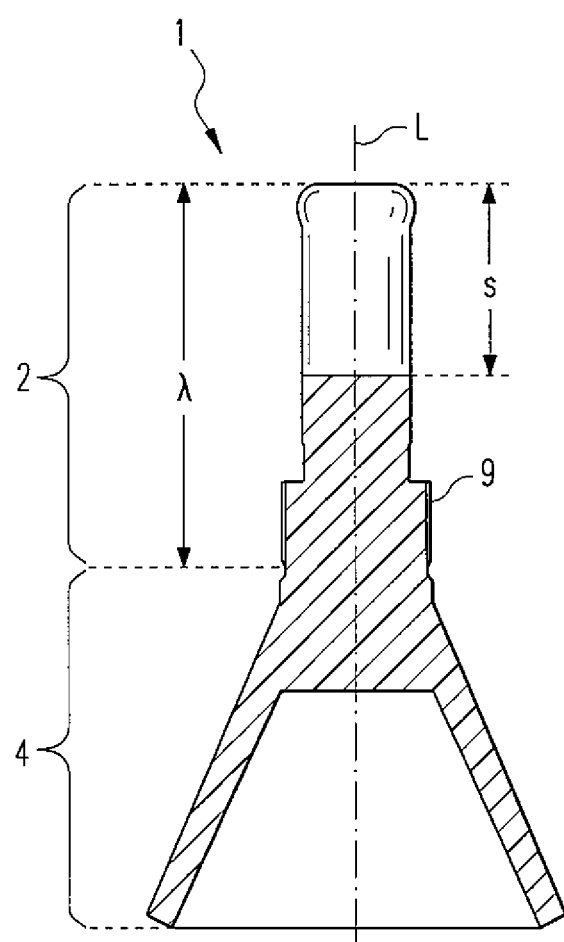
FIG. 2 shows a cross-sectional sketch thereof.

FIG. 1 shows a sketch of a view of a dental tool 1 in accordance with the invention; a corresponding cross-section is sketched in FIG. 2. The tool 1 comprises a shank region 2 and a work region 4. The shank region 2 is elongate so that it extends along a longitudinal axis L. The tool 1 can be provided in particular for treatment of teeth, for example for prophylactic treatment.

Figure 5:
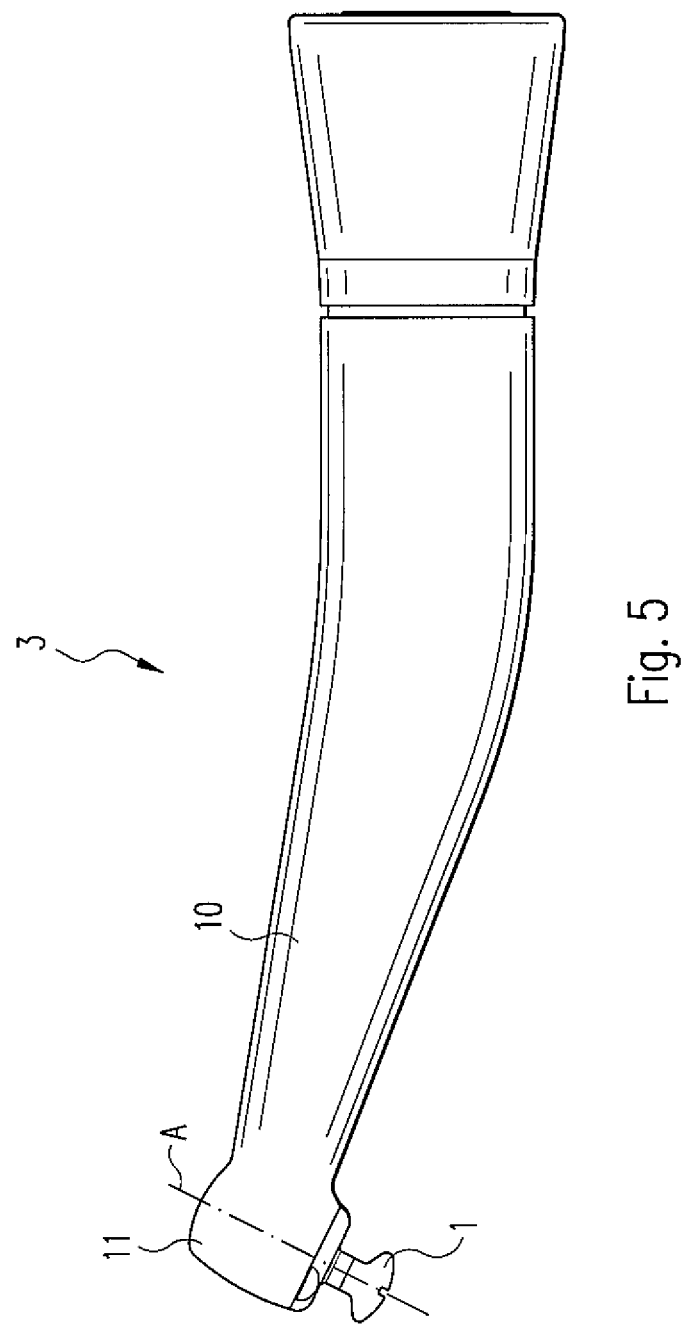
FIG. 5 shows a sketch of a handpiece.

FIG. 5 shows, by way of example, a dental handpiece 3. The handpiece 3 has an elongate grip sleeve 10 with a drive arranged therein and also a head region 11 arranged at a front end of the grip sleeve 10. The drive is preferably configured to be moved by a motor (not shown in the figures).

The handpiece 3 can be a so-called angle piece, in particular a prophylactic angle piece.

The work region 4 can, for example, be formed as a polisher, brush, cleaning brush, grinder or file. The work region 4 can then be formed for example—as shown by way of example in FIG. 2—in a cup-like or conical or cylindrical manner. For example, the tool can, as already mentioned briefly above, be a tool for prophylactic treatment.

The tool 1 is provided to be releasably connected to the handpiece 3, in particular to its head region 11. A dental system in accordance with the invention has the handpiece 3 and the tool 1, with the tool 1, as intended for operation of the handpiece 3, being connected to the head region 11.

The head region 11 for this can have a drive component connected to the drive, for example in the form of a sleeve which extends in particular along an axis A and is configured to receive the shank region 2 of the tool 1, hold it and couple it to the drive. In this case, the configuration is such that the tool 1 can be correspondingly connected to the handpiece 3 by being pushed into the sleeve of the head region 11, aligned—coming from the outside—with its shank region 2 parallel to the axis A. In the inserted state of the tool 1 the longitudinal axis L of the shank region 2 is thus orientated so as to be parallel to the axis A and/or coincides with the axis A.

The axis A can, as is the case in the configuration shown in FIG. 5, enclose an angle—the so-called head angle—of, for example, 90° or 100° with a longitudinal axis established by the grip sleeve 10.

The shank region 2 of the tool 1 is formed so that there is the possibility of latchable insertion and removal without actuation. In particular, the configuration is such that the shank region 2 can be inserted into the head region 11 of the handpiece 3 for coupling to the drive and/or to the drive component and can also be removed again from the head region 11 without it being necessary for an operating element of the handpiece 3 to be actuated therefor. In this case, a latching connection is provided between the shank region 2 and the drive component by means of which the tool 1 is held in the head region 11. The latching connection is thus configured in such a way that—with tool 1 inserted—the shank region 2 is held in a certain intended position with respect to the drive component, viewed in the direction of the axis A of the head region 11. In other words, the latching connection is used for axial securement of the tool 1 in the head region 11 and/or with respect to the drive component.

Basically, the tool 1 can consist of a metal. However, at least the shank region 2 of the tool 1 preferably consists of a plastics material, a silicone or a rubber. As a result of this choice of material, it is possible to achieve a situation in a particularly suitable manner where the latching connection between the shank region 2 and the drive component can be established and released again in a particularly simple manner—in particular without the aid of an auxiliary instrument. In order to establish the latching connection, the tool 1 then merely needs to be inserted or pushed manually into the head region 11; for the release, the tool 1 merely needs to be removed from the head region 11, for example by drawing it out manually.

Moreover, it is advantageous to configure at least the shank region 2 of the tool 1 from plastics material, silicone or rubber, because as a result particularly simple and inexpensive production is rendered possible. In this way, the tool 1 can be configured in a particularly suitable manner as a disposable part. This is particularly advantageous, for example, if the tool is a tool for prophylactic treatment.

In accordance with the prior art it is usual for prophylactic tools, such as brushes or polishing cups, to be sterilized after use and reused (several times). During the course of tartar-removal, bloody regions regularly develop in the mouth cavity which have to be treated later on with tools that have already been used. Therefore, there is a considerable problem pertaining to hygiene here. By using corresponding disposable parts or disposable tools, this can be countered in an effective manner.

Furthermore, the work region 4 preferably also consists of plastics material, silicone or rubber, for example of an elastomer. This is advantageous in terms of production techniques. In particular, the shank region 2 and the work region 4 can then consist of plastics materials, silicones or rubbers of differing hardnesses. For example, the shank region 2 can be formed from a harder material than the work region 4. In this way, the shank region 2 is particularly suited to taking up a movement of the drive component in an effective manner, whilst the work region 4 has material properties that are suitable for treatment of teeth.

The work region 4 can, however, also have, for example, bristles or be formed of bristles so that it is formed as a brush. Such bristles can also be advantageously connected to the shank region 2, which consists of plastics material, using production techniques.

The shank region 2 and the work region 4 are preferably connected together in one piece so that therefore the shank region 2 and the work region 4 together form one piece. This is also advantageous with respect to the producibility of the tool. For example, the tool 1 can be produced in this way in a two-component injection-moulding process.

The shank region 2 is preferably formed in a substantially cylindrical manner. In the example shown, the shank region 2 is shaped in such a way that it has an outer-surface region 20 which describes a circular cylinder orientated symmetrically with respect to the longitudinal axis L.

Furthermore, the shank region 2 is preferably formed—with regard to its longitudinal axis L—for axial or radial latching with the drive component of the handpiece 3. In other words, the latching connection between the shank region 2 and the drive component can be configured to act axially or radially with respect to the longitudinal axis L.

Figure 3:
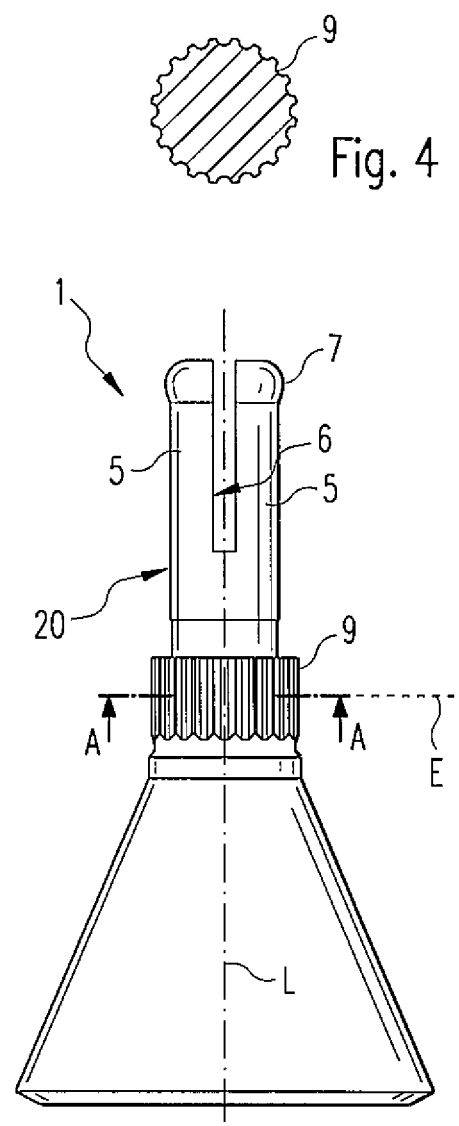
FIG. 3 shows a side view thereof.

A side view of the example shown in FIG. 2 is sketched in FIG. 3. In this configuration, two spring arms 5 are arranged at the shank region 2 and/or are formed as parts of the shank region 2. The spring arms 5 in this case have outwardly protruding latching projections 7 or latching thickened portions. These latching projections 7 extend in other words, with respect to the longitudinal axis L of the shank region 2, radially outwards, in particular radially outwards beyond the outer-surface region 20. In this case, the latching projections 7 form a tool-side latching component of the latching connection between the shank region 2 and the drive component. The latching projections 7 are preferably formed at those ends of the spring arms 5 that lie opposite the work region 4.

The latching component on the drive-component side corresponding hereto in this case is preferably formed by a suitably corresponding depression in the drive component, for example therefore by an "inner" annular groove formed in the sleeve.

In the example shown, the two spring arms 5 are configured so as to run parallel to the longitudinal axis L. For the formation of the spring arms 5, in this case the shank region 2—as shown by way of example in FIG. 3—can advantageously have a slot 6 which is formed in particular at the end of the shank region 2 lying opposite the work region 4. In the example shown, the slot 6 extends with a length s in a straight line parallel to the longitudinal axis L.

In the example shown, the shank region 2 has a longitudinal extent $\lambda$ along the longitudinal axis L, with the slot 6 extending along the longitudinal axis L substantially over half of this longitudinal extent $\lambda$ of the shank region 2. For example, $0.25\lambda < s < 0.75\lambda$ can be provided for the relationship between the longitudinal extent $\lambda$ of the shank region 2 and the length s of the slot.

The latching projections 7 can—as shown in FIG. 3—be formed at those ends of the spring arms 5 that lie opposite the work region 4.

The latching projections 7 are preferably shaped in such a way that their surfaces that point radially outwards merely form a curvature that points outwards, that is, in particular do not form an edge. Thus in particular it is possible to prevent a situation from occurring where the latching connection comprises two interlocking shoulder-surface regions orientated perpendicularly to the longitudinal axis L, which would significantly impede manual release of the latching connection or would make it practically impossible. Therefore, the merely curved configuration of the latching projections 7 is advantageous in particular with respect to there being suitable releasability of the latching connection between the shank region 2 and the drive component. For example, the user can remove the tool 1 from the handpiece 3 by simply pulling on the tool 1 sufficiently firmly in the longitudinal direction so that the tool 1 snaps out of the handpiece 3.

Figure 4:
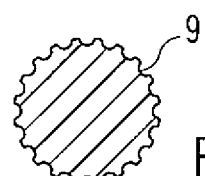
FIG. 4 shows a sketch of a section along the line A-A in FIG. 3.

The coupling between the shank region 2 and the drive component is preferably configured as a form-locking coupling. This is advantageous with respect to the effectiveness of the coupling. FIG. 4 shows regarding this a sketch of a section along the line A-A in FIG. 3, that is, a section in a plane E which is orientated so as to be perpendicular to the longitudinal axis L. As is sketched in particular in FIGS. 3 and 4 by way of example, the shank region 2 can have a carrier region 9 which is formed for the form-locking coupling to the drive component of the dental handpiece 3, in particular for a form-locking coupling that acts in the plane E. In this way, a situation can be achieved where a rotational movement of the drive component going around the axis A can be transmitted to the shank region 2 in a particularly suitable and effective manner.

The carrier region 9 preferably extends at least partly radially outwards beyond the outer surface 20.

Accordingly, the drive component has an engagement region which is configured in a manner that corresponds to the carrier region 9 in such a way that—with tool 1 inserted—together with the carrier region 9 it forms the coupling between the drive component and the shank region 2.

The form-locking coupling is also advantageous in particular with respect to transmission of force from the drive component to the shank region 2 in the case of a rotational movement that repeatedly changes its direction of rotation, that is, in particular an oscillating rotational movement, as can be provided, for example, if the tool is a polishing tool. Almost play-free transmission of force can thus be realized.

The carrier region 9 can, for example, have an angular, preferably polygonal, outer periphery. As follows from the section shown in FIG. 4, a multi-tooth connection can be provided. In the example shown, 20 teeth are formed uniformly distributed over the periphery. The number of teeth in this case corresponds with the number of possible rotational positions in which the shank region 2 of the tool 1 can be inserted into the head region 11 of the handpiece 3 and/or into the drive component, in which case this number can be chosen freely in a suitable manner.

In general, the drive can be formed to transmit a rotational movement and/or an oscillation and/or an axial lifting movement to the tool 1.

Figure 6:
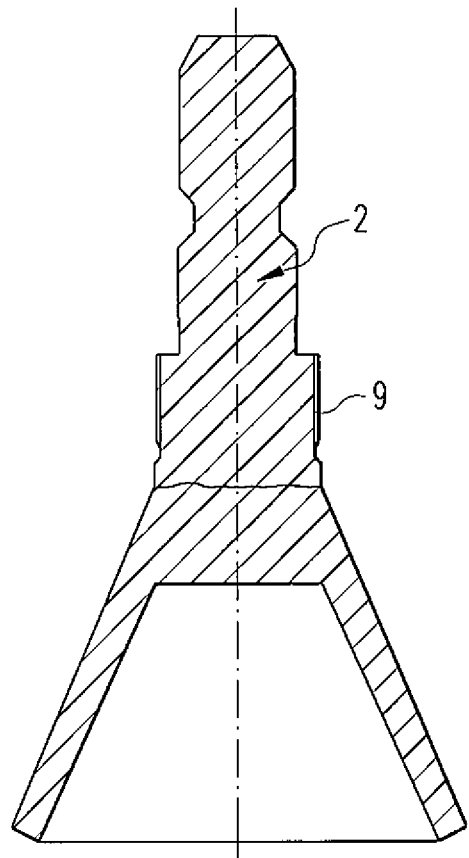
FIG. 6 shows a cross-sectional sketch of a further exemplary embodiment.
Figure 7:
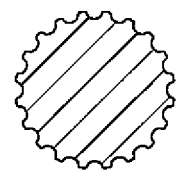
FIG. 7 shows a side view thereof.
Figure 8:
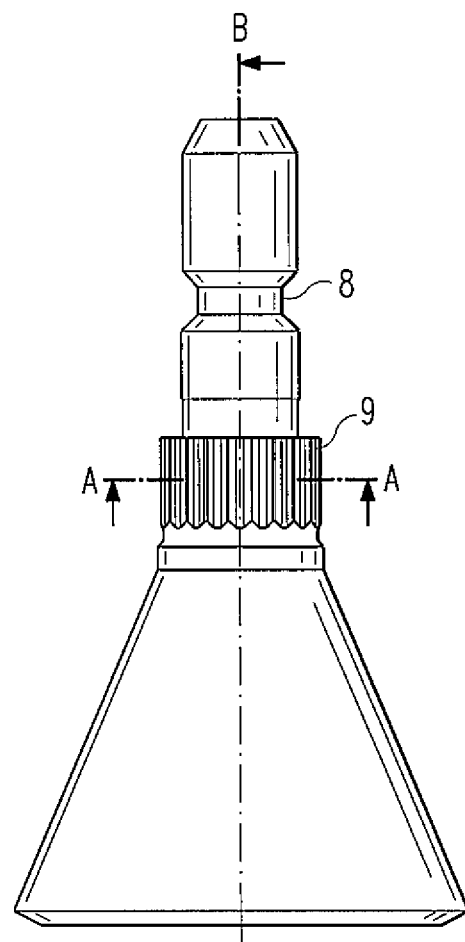
FIG. 8 shows a sketch of a section along the line A-A in FIG. 7.
Figure 9:
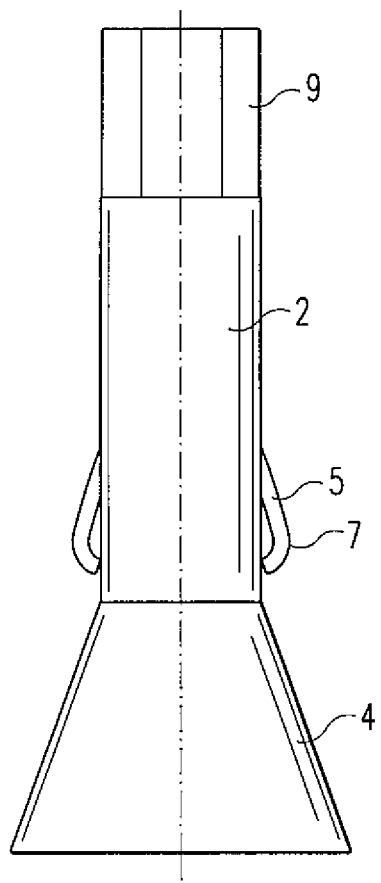
FIG. 9 shows a sketch of a further exemplary embodiment.

A further exemplary embodiment of a tool is shown in FIGS. 6 to 8. In the following, merely the differences with respect to the tool described above are discussed. The reference numerals are used analogously.

In the case of the configuration shown here, the shank region 2 has a latching recess 8 which is used to establish the latching connection between the shank region 2 and the drive component. The latching recess 8 preferably extends across the entire periphery, that is, annularly, in particular in a plane that is orientated perpendicularly to the longitudinal axis L. The latching recess 8 in the case of this configuration thus forms the tool-side latching component. In this case in order to establish the latching connection, the drive component has a corresponding latching component that engages into the latching recess 8 when the tool 1, as intended, is inserted in the head region 11.

In FIGS. 9 to 15, further possibilities of configuration of the tool are sketched. As sketched in FIGS. 9 and 10, the carrier region 9 can be formed at that end of the shank region 2 that lies opposite the work region 4. The spring arms 5 with the latching projections 7 can accordingly be formed between the carrier region 9 and the work region 4. As follows, furthermore, in an exemplary manner from FIGS. 9 and 10, the carrier region 9 can have a polygonal, in particular hexagonal, cross-section.

Figure 11:
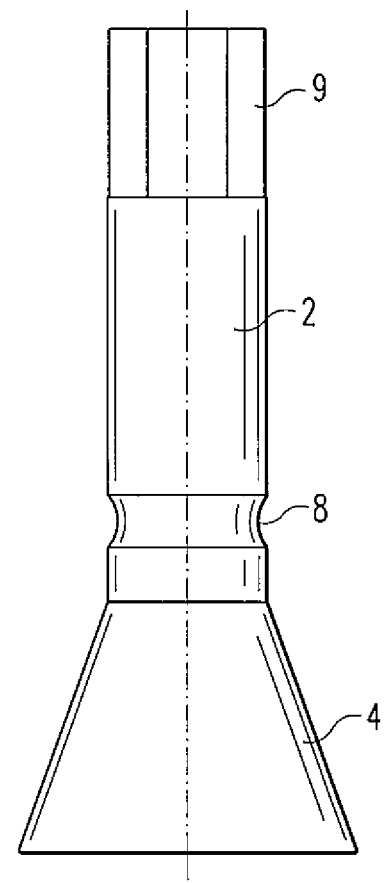
FIG. 11 shows a sketch of a further exemplary embodiment.
Figure 10:
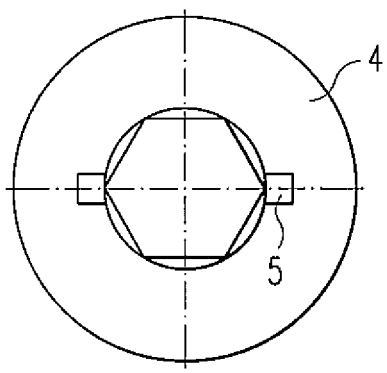
FIG. 10 shows a further view thereof, viewed in the direction of the longitudinal axis of the shank region.
Figure 12:
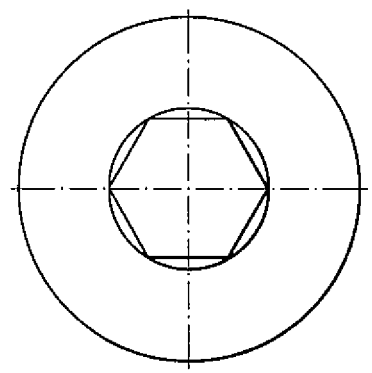
FIG. 12 shows a further view thereof, viewed in the direction of the longitudinal axis of the shank region.
Figure 13:
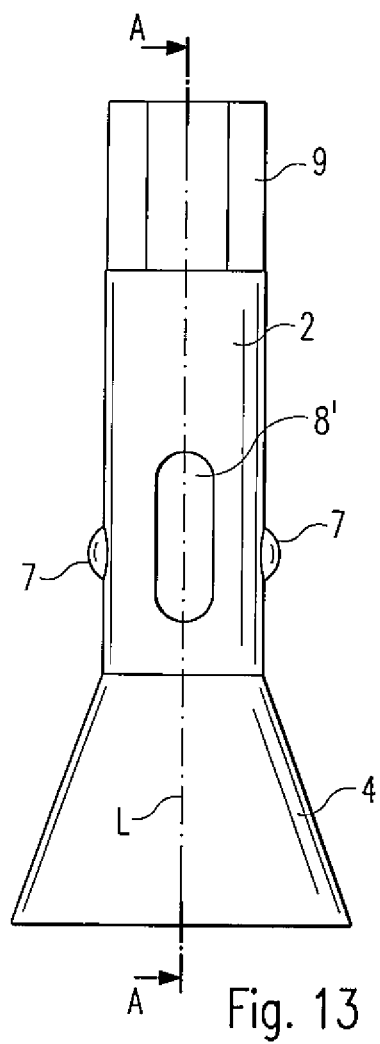
FIG. 13 shows a sketch of a further exemplary embodiment.
Figure 15:
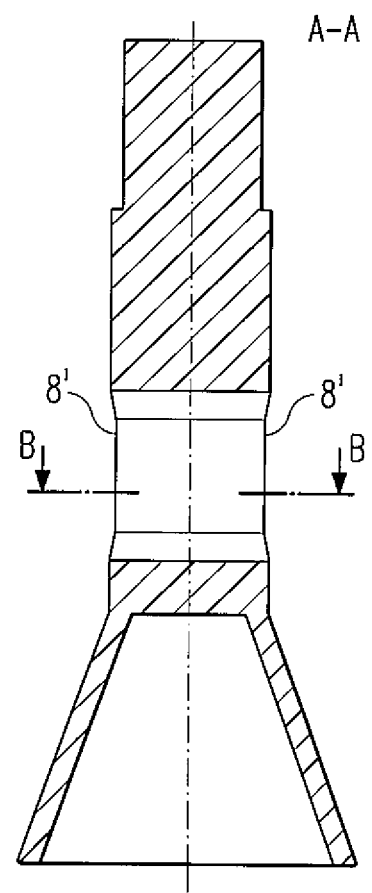
FIG. 15 shows a sketch of a section along the line A-A in FIG. 13.
Figure 14:
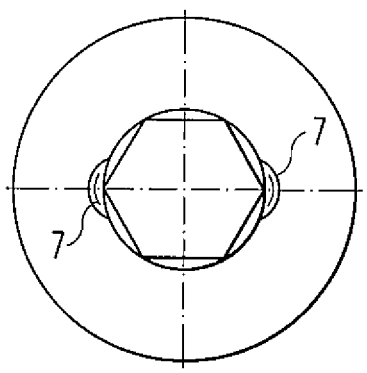
FIG. 14 shows a further view thereof, viewed in the direction of the longitudinal axis of the shank region.
Figure 16:
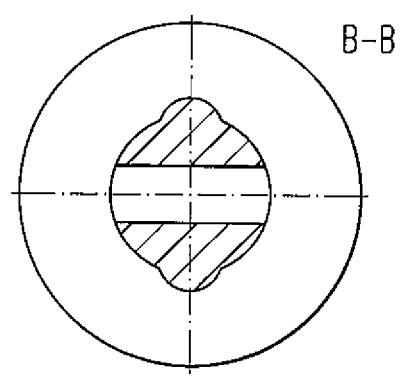
FIG. 16 shows a sketch of a section along the line B-B in FIG. 15.

As sketched in FIGS. 11 and 12, the latching recess 8 can also be formed as a tool-side latching component between the carrier region 9 and the work region 4.

As in the case of the example shown in FIGS. 13 to 16, the tool-side latching component can have not only latching projections 7, but also a latching recess 8'. The latching recess 8' in this example is configured so as to be elongate, extending parallel to the longitudinal axis L. In this case, two corresponding latching recesses 8' can be formed, in particular lying diametrically opposite each other, or—as follows from FIG. 16—can be configured as a through-opening of the shank region 2 running transversely to the longitudinal axis L.

In the case of the examples shown above with the aid of FIGS. 2 to 10, the shank region 2 has two spring arms 5. Basically, however, it is also possible to provide merely one spring arm or more than two spring arms for the shank region 2.

As mentioned above, the tool 1 is formed so that there is the possibility of removal without actuation. However, for facilitated removal, a beaker-like element can be provided that has a fork-like region at an upper edge in such a way that the tool 1 that is to be removed can be hooked into the fork-like region and subsequently—with the element fixed—by raising or drawing the handpiece 3 the tool 1 can be released out of the head region 11 without the use of a hand.

The grip sleeve 10 of the handpiece 3 preferably has a plastics casing. The head region 11 also preferably has a plastics casing. For this, polyetheretherketone (PEEK) is preferably used as the plastics material. However, basically a less durable plastics material, such as for example polyphenylsulphone (PPSU) or polyetherimide (PEI), is also suitable.

Plastics material also represents a material that is pleasant to grip, and moreover it is advantageous because it has a comparatively low weight. Inner portions can also be provided that have self-tapping threads that can be screwed in the grip sleeve 10—without prefabricated threads. Particularly simple and inexpensive production is thus rendered possible.

The grip sleeve 10 with the head region 11 preferably consists of plastics material. In particular, the configuration can be such that both the grip sleeve 10 and the head region 11 have a plastics casing, in which case these two plastics casings are configured so as to be coherent, that is, so as to form one piece. In this way, in particular a situation can be achieved where the handpiece 3, viewed across the grip sleeve 10 and the head region 11, has no separating line or separating edge at all, having in particular a continuously smooth surface.

Basically, however, the grip sleeve 10 and the head region 11 can generally also have an outer-surface region that consists of metal, for example of steel, non-ferrous metal or titanium.

Figure 17:
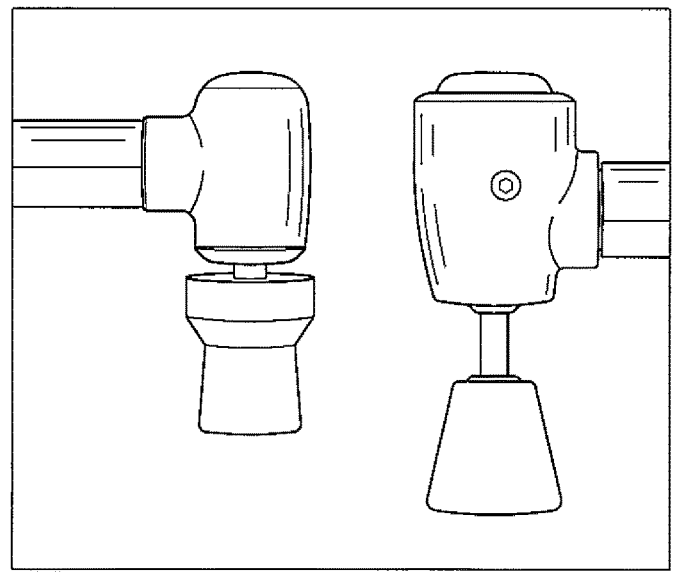
FIG. 17 shows two different head regions of handpieces, each fitted with a tool.
Figure 18:
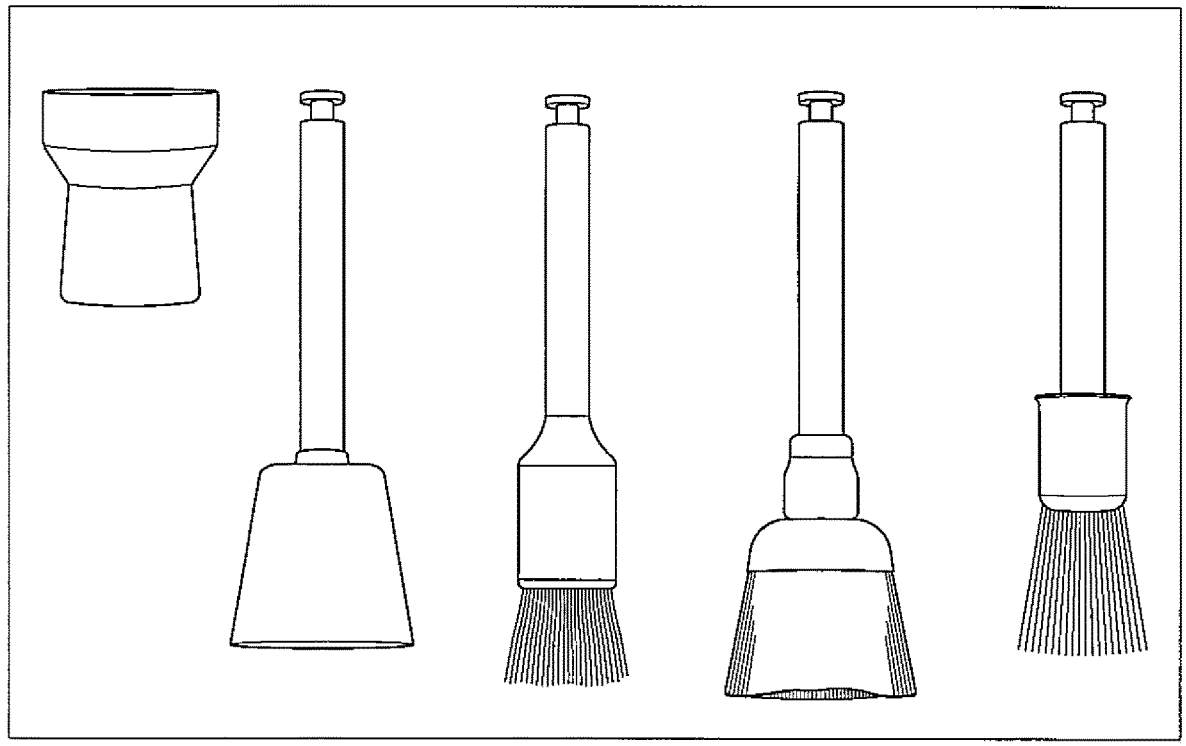
FIG. 18 shows five different tools in accordance with the prior art.

FIG. 17 shows, in order to illustrate size ratios, how these can be attained with the tool and/or system described here: it is precisely in the side-tooth region that a relatively large head height has a very disadvantageous effect. In order to obtain reasonable results in the event of application, the tool must be inserted as perpendicularly as possible to the surface that is to be treated; in this case the height of the head is particularly disturbing and a hindrance. In contrast with the embodiment shown in FIG. 17 on the left-hand side, it is possible to reduce the height of the head with the tool still further significantly.

In particular the following advantages can be attained with the invention:

The tool and the head region can be configured with a particularly small structural size.

The tool is suitable both for a rotating and for an oscillating drive, in which case an axial lifting movement can also be transmitted.

The tool can be inserted into the head region and removed from the head region in a particularly simple and at the same time hygienic manner.

The handpiece can be cleaned particularly easily on account of the absence of separating edges.

The handpiece is of a particularly low weight.

The tool can be produced in a particularly inexpensive manner, for example so that it comes off a machine finished.

The handpiece presents a particularly pleasant grip feel.

The transmission of force from the drive component of the handpiece to the tool is particularly effective, in particular on account of a particularly small amount of play in entrainment during oscillating use.

The handpiece can be produced in a particularly inexpensive manner, since no actuation system is required in order to release the tool.

What is claimed is:

1. A dental tool comprising:
 a shank region configured to be coupled to a dental handpiece, the shank region having a first end and second, opposite end along a longitudinal axis, wherein the first end includes a carrier region having an angular, polygonal, outer periphery, and the second end includes spring arms separated by an axially-extending slot, wherein each spring arm includes a latching projection extending radially outwardly from an end of the spring arm, wherein the latching projections are configured to extend and latch into the dental handpiece to hold the dental tool axially in place, and wherein the carrier region is configured to engage a drive component of the dental handpiece and is configured for form-lock coupling to the drive component such that the dental tool is configured to be rotated about the longitudinal axis at the carrier region via the drive component; and
 a work region extending axially away from the first end of the shank region such that the carrier region is disposed axially between the spring arms and the work region, wherein the work region is configured to be rotated via the drive component;
 wherein the shank region is comprised of a plastic material, and is configured to be
  latched into a head region of the dental handpiece with the latching projections, and
  insertable and removable from the head region of the dental handpiece without actuation of any element on the dental handpiece.

2. The dental tool according to claim 1, wherein the carrier region includes a plurality of radially projecting teeth.

3. The dental tool according to claim 2, wherein the work region consists of a plastics material, wherein the plastics material of the work region is silicone or rubber, and wherein the plastics material of the shank region is a different hardness than the plastics material of the work region.

4. The dental tool according to claim 1, wherein the shank region has a substantially cylindrical shape.

5. The dental tool according to claim 4, wherein the shank region has an annular latching recess that extends around an entire periphery of the shank region.

6. The dental tool according to claim 1, wherein the spring arms run parallel to the longitudinal axis.

7. The dental tool according to claim 1, wherein the work region is a polisher, brush, grinder or file.

8. The dental tool according to claim 7, wherein the work region has a cup-like, conical or cylindrical shape.

9. A dental system comprising:
the dental tool according to claim 1; and the dental handpiece, which has an elongate grip sleeve with the drive component arranged therein and also a head region arranged at a front end of the grip sleeve for releasably receiving the dental tool.

10. The dental system according to claim 9, wherein the drive component is form-lock coupled to the dental tool and is configured to rotate the dental tool about the longitudinal axis at the carrier region.

11. The dental system according to claim 9, wherein the grip sleeve has a plastics casing.

12. The dental system according to claim 11, wherein the grip sleeve consists of plastics material.

13. The dental system according to claim 11, wherein the plastics material is PEEK, PPSU or PEI.

14. The dental tool of claim 1, wherein the latching projections extend away from one another in opposite directions, and each have a rounded profile to facilitate being inserted and removed from the dental handpiece.

15. A dental system comprising:
the dental tool of claim 1; and
the dental handpiece having the drive component;
wherein the dental tool is coupled to and rotated by the dental handpiece via the carrier region, wherein the drive component of the dental handpiece is form-lock coupled to the dental tool and is configured to rotate the dental tool about the longitudinal axis at the carrier region;
wherein the dental handpiece includes an inner annular groove, and wherein the latching projections are disposed in the inner annular groove.

16. A method of attaching the dental tool of claim 1 to the dental handpiece, the method comprising:
bending the spring arms toward one another and pressing the dental tool up into the dental handpiece; and
releasing the spring arms such that the latching projections extend away from one another and hold the dental tool axially in place in the dental handpiece.

17. A method of removing the dental tool of claim 1 from the dental handpiece, the method comprising:
bending the spring arms toward one another and pulling the dental tool away from the dental handpiece.

18. The dental tool of claim 1, wherein the shank region consists of a plastic material.

19. The dental tool of claim 1, wherein the shank region and the work region are connected together in one piece.

20. A method of operating the dental tool of claim 1, the method comprising:
form-lock coupling the dental tool to the drive component of the dental handpiece; and
rotating the dental tool about the longitudinal axis via the drive component.

* * * * *